UNITED STATES PATENT OFFICE.

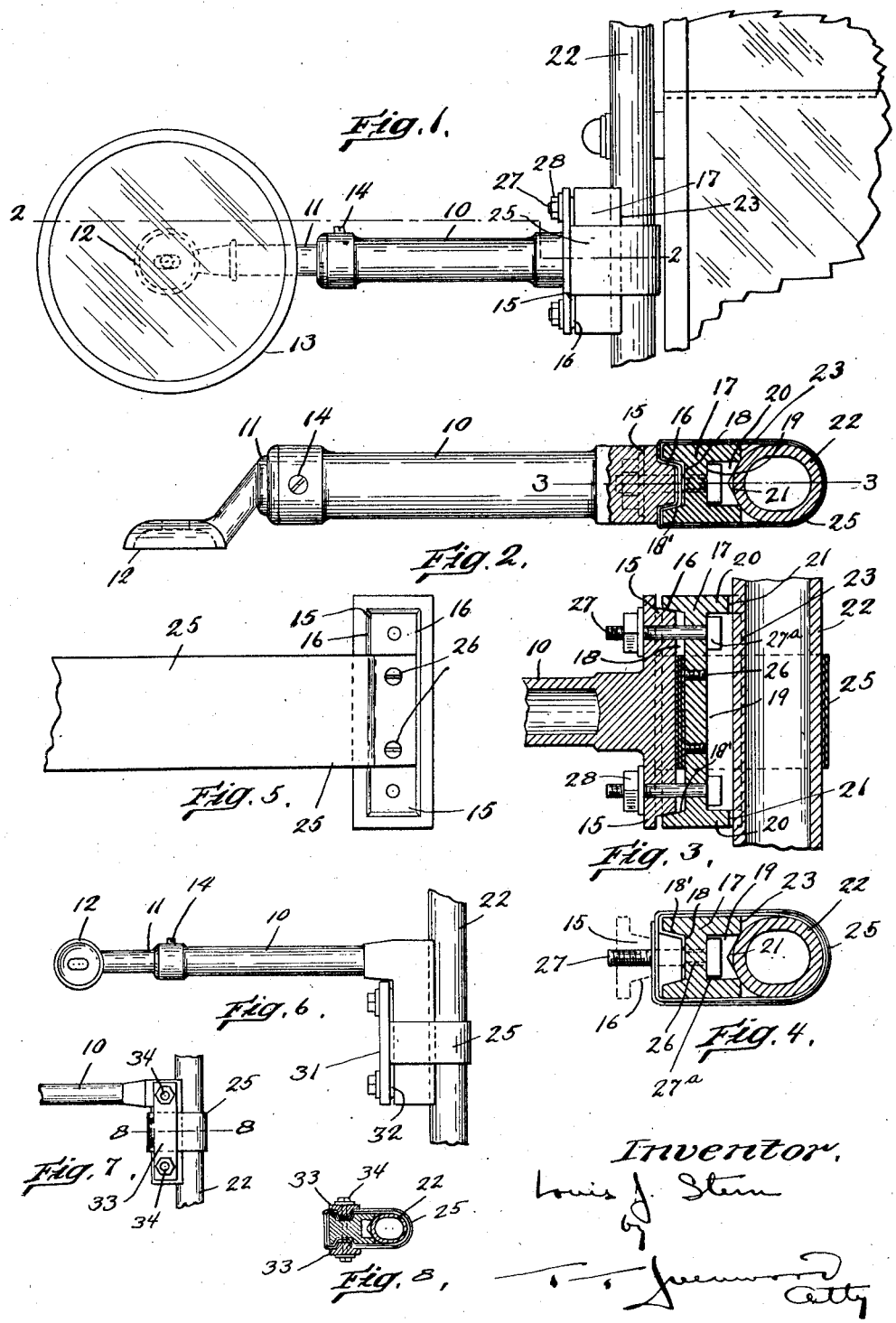

LOUIS J. STERN, OF BOSTON, MASSACHUSETTS.

MIRROR-MOUNTING.

1,328,930.

Specification of Letters Patent. Patented Jan. 27, 1920.

Application filed November 6, 1919. Serial No. 336,150.

*To all whom it may concern:*

Be it known that I, LOUIS J. STERN, a citizen of the United States, residing at Boston, in the county of Suffolk and State of Massachusetts, have invented an Improvement in Mirror-Mountings, of which the following is a specification.

My present invention relates to a mirror or spotlight mounting for automobiles and has for its object the provision of a mounting having a flexible strip adapted to be wrapped about a standard or support of an automobile, and about the mounting, to secure it to the standard; and having novel features of construction by which the strip is drawn taut and secured to the mounting.

Figure 1 is an elevation of a mirror mounting embodying my invention attached to a windshield standard of an automobile.

Fig. 2 is a plan section along line 2—2 of Fig. 1.

Fig. 3 is a detail in section along line 3—3 of Fig. 2.

Fig. 4 is a plan section of the clamping block and windshield bracket before the flexible strip is drawn taut.

Fig. 5 is a front view detail of the clamping block with the flexible strip extended therefrom illustrating the method of securing the strip to the block.

Fig. 6 is a modified form of mounting and strip clamping means.

Fig. 7 is a further modified form of mounting and strip clamping means.

Fig. 8 is a section on line 8—8 of Fig. 7.

As here shown the mounting includes the bracket arm 10 interiorly and axially recessed to slidably receive the rod 11 having the cup-shaped terminal portion 12 in which the mirror 13 is received. Said rod is adjustable in said arm whereby the mirror may be extended to a greater or less distance from the windshield and may be secured in adjusted position by the set-screw 14.

Said arm 10 terminates in the butt 15 extended on opposite sides of said arm. Said butt is formed with tapered side or wedge walls 16 and is adapted to enter a complementary channel in a clamping member to draw a flexible clamping strip taut and to be firmly secured to the clamping member.

The clamping member comprises the block 17 of substantial length as compared with its width having the channel 18 with tapered or wedge walls 18' in which said butt 15 is adapted to be received.

The opposite face of said clamping block is formed with the substantially rectangular recess 19 therein in which the heads of clamping bolts are adapted to be received; and the end walls 20 have the V-shaped notches 21 therein in which the standard 22 of the windshield or other support of an automobile is received. Because of the shape of the notches in said end walls, said block 17 may be firmly clamped to said standard, be it of circular or elliptical cross section; and as the clamping face 23 of said block is flat, it may likewise be secured against a flat support not necessarily shown.

The flexible clamping strip 25 is formed of some relatively soft material, as copper, and is of suitable length to be wrapped about the standard and block in the manner hereinafter to be described. One end of said strip is permanently fixed to the clamping block by the screws 26 extended into the bottom wall of the butt receiving channel 15.

Clamping bolts 27 are extended through alined openings in the bottom wall of the channel 18 in said block and in said butt 15 and opposite sides of the heads 27ª thereof engage the opposite side walls of the recess 19 to prevent the turning of said bolts upon the tightening of the nuts 28 to draw said butt of the bracket into said channel 18 and also to draw taut the flexible strip wrapped therebetween.

It has formerly been the practice, in devices employing a flexible strip for clamping purposes, to wrap the strip once around the support and the bracket and then tighten up the strip drawing and clamping plates. However, because the free end of the strip offered no resistance to the drawing force, and holding the free end taut with the hand while tightening the clamping plates did not provide sufficient opposition to the drawing force, the drawing took place practically only from the free end of the strip and the portion of the strip wrapped about the support remained slack or, at least, was not sufficiently taut. Various forms of clamping devices, such as plates having a plurality of corrugations into which the strip is drawn, have not been particularly effective. I have found, however, that when the flexible strip is wrapped, not just over, but twice, about the support and clamped, a snubbing action between the two turns is set up which prevents the drawing of the free end of the strip and the result is that the entire strip is drawn taut and the mounting is drawn firmly against the support.

Accordingly, I wrap the flexible strip 25 twice about the support 22 and the clamping block 17, and the relative relation of the turns of the strip, the support and the clamping block before the butt 15 of the bracket is drawn into the channel 18 is illustrated in Fig. 4. As the clamping nuts 28 are tightened the butt 15 forces the strip down into the channel 18 in said clamping block, thereby drawing said strip taut about the clamping block and support. In the completed clamping operation as shown in Fig. 2, the bracket 10 is firmly fixed to said clamping block and, through said block and the flexible strip 25, to the support. It is to be noted that the clamping bolts 27 serve to draw the strip 25 taut and also to secure the bracket to the clamping block.

In Fig. 6 a modified form of the invention is shown in which the bracket 10 is integral with the clamping block and its butt is in the form of a clamping plate 31 which extends only on one side of the bracket and has a wedge projection 32 adapted to force the flexible strip 25 into the clamping channel not necessarily shown.

In the modification illustrated in Figs. 7 and 8 two clamping plates 33 are provided on opposite sides of the butt, and two clamping channels are formed in the butt. The clamping bolts 34 extend through the butt and engage both clamping plates.

It is obvious that yet other modifications are within the scope of my invention.

I claim:—

1. A mirror mounting including a clamping block having a channel and a support engaging face, a flexible strip adapted to be wrapped about said block and a support, a bracket having a butt, and means to draw said strip and butt within said channel.

2. A mirror mounting including a clamping block having a support engaging face and a recess, a bracket having a complementary projection, a flexible clamping strip adapted to be wrapped about said block and a support, and means to draw the projection of said bracket and said strip into said recess.

3. A mirror mounting including a clamping block, a flexible clamping strip adapted to be wrapped about said block and a support, a bracket, and means to clamp said bracket to said block and also to draw said strip taut about said block and support.

4. A mirror mounting including a clamping block, a bracket, a flexible strip adapted to be passed between said bracket and block and about a support, and means to clamp said bracket to said block with said strip therebetween.

5. A mirror mounting including an arm having a butt extended on opposite sides of it, a clamping block having a channel adapted to receive the butt, clamping bolts extended through the butt on opposite sides of said arm, and through said blocks, and a flexible clamping strip passed between said block and the butt.

6. A mirror mounting including an arm having a butt extended on opposite sides of it, a clamping block having a channel in one face adapted to receive the butt and a recess in the opposite face, clamping bolts extended through said butt on opposite sides of said arm and through said block with the heads thereof received in said recess and in engagement with the side walls thereof, and a flexible clamping strip passed between said block and the butt and clamped in the channel.

In testimony whereof, I have signed my name to this specification, in the presence of a subscribing witness.

LOUIS J. STERN.

Witness:
H. B. DAVIS.